M. L. HUNKER.
EAVES TROUGH FORMING MACHINE.
APPLICATION FILED JUNE 4, 1917.

1,261,735.

Patented Apr. 2, 1918.
8 SHEETS—SHEET 1.

Fig. 1

INVENTOR.
M. L. Hunker
BY
H. E. Dunlap
ATTORNEY.

M. L. HUNKER.
EAVES TROUGH FORMING MACHINE.
APPLICATION FILED JUNE 4, 1917.

1,261,735.

Patented Apr. 2, 1918.
8 SHEETS—SHEET 3.

INVENTOR.
M. L. Hunker
BY
H. E. Dunlap
ATTORNEY.

M. L. HUNKER.
EAVES TROUGH FORMING MACHINE.
APPLICATION FILED JUNE 4, 1917.

1,261,735.

Patented Apr. 2, 1918.
8 SHEETS—SHEET 7

INVENTOR.
M. L. Hunker.
BY
ATTORNEY.

UNITED STATES PATENT OFFICE.

MARTIN L. HUNKER, OF WHEELING, WEST VIRGINIA, ASSIGNOR TO WHITAKER-GLESSNER COMPANY, OF WHEELING, WEST VIRGINIA, A CORPORATION OF WEST VIRGINIA.

EAVES-TROUGH-FORMING MACHINE.

1,261,735.

Specification of Letters Patent.

Patented Apr. 2, 1918.

Application filed June 4, 1917. Serial No. 172,609.

*To all whom it may concern:*

Be it known that I, MARTIN L. HUNKER, a citizen of the United States of America, and resident of Wheeling, county of Ohio, and State of West Virginia, have invented certain new and useful Improvements in Eaves-Trough-Forming Machines, of which the following is a specification.

This invention relates broadly to sheet metal shaping apparatus, and more specifically to a machine for forming eaves troughs.

The primary object of the invention is to provide a machine for the manufacture of eaves troughs in which a sheet metal blank is subjected to a series of definite shaping operations in step by step sequence for producing the finished merchantable product and in which such operations are performed automatically, or without manual control or handling of the material acted upon, from the time the plain blank is introduced until it emerges in its completed form.

A further object is to provide a machine of the character mentioned embodying a plurality of graduated positively driven forming dies or rolls which successively operate upon and feed or advance the metal forward at a uniform speed and without distortion, gradually bringing the stock to the desired shape.

Another object is to provide an automatic eaves-trough-forming machine whereby the lateral beads of the trough are formed with the usual inner locks.

A still further object of the invention is to provide, in a machine for forming eaves troughs and like laterally-beaded articles of arcuate cross-sectional form, novel and improved means whereby the stock is gradually and accurately shaped into arcuate or trough form subsequent to the bead-forming operations without distortion of the preformed beads.

With these and other important objects in view, the invention resides in the features of construction, arrangement of parts and combinations of elements which will hereinafter be exemplified, reference being had to the accompanying drawings, in which—

Referring to said drawings, in which like designating characters distinguish like parts throughout the several views—

1 indicates a frame or table of any appropriate form upon the top of which adjacent to its front end are mounted housings 2 in which is journaled a plurality of horizontally alined roll shafts 3$^a$ upon which are disposed a series of rollers 4$^a$, 5$^a$, 6$^a$, 7$^a$, 8$^a$ and 9$^a$ constituting the lower rollers of a plurality of sets of flanging rollers, of which the upper rollers 4, 5, 6, 7, 8 and 9 are mounted upon overlying shafts 3 which are journaled in bearing blocks 10 that are vertically movable in said housings 2. Said bearing blocks are yieldingly maintained depressed into seated relation to the underlying rollers by springs 11 the tensions of which are adjusted by means of pressure screws 12 projected through plates 13 overlying said housings.

A second series of alined rollers 14, 15, 16, 17, 18, 19, 20, 21 and 22 is located on an intermediate portion of the table, the same being designed as beading rollers and being mounted on housings 2$^a$ corresponding to said housings 2. Located adjacent to the rear end of the table is a third series of rollers 23, 24, 25, 26, 27 and 28 constituting trough-forming rollers, the same being mounted on housings 29 carried by said table and having the upper rollers of each set held seated under adjustable spring tension.

Figure 9:
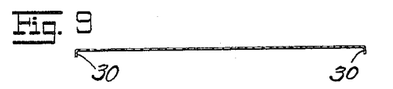
Figs. 9 to 30, inclusive, illustrate the successive shapes which the metal operated upon is caused to assume by the various shaping rolls.
Figure 10:
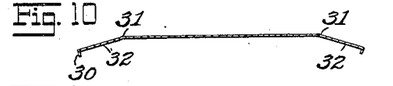
Figure 11:
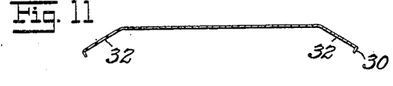
Figure 12:
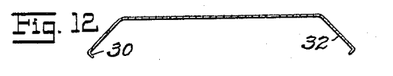
Figure 13:
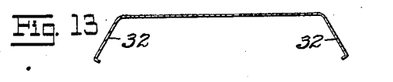
Figures 14, 15:
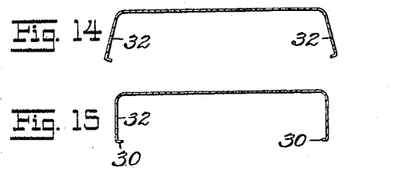
Figure 16:
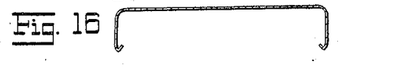
Figure 17:
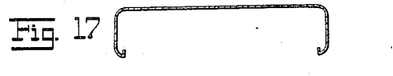
Figure 18:
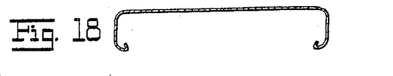
Figure 19:
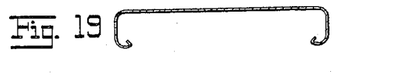
Figure 20:
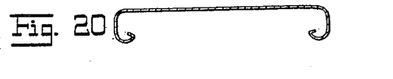
Figure 21:
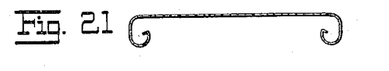
Figure 22:
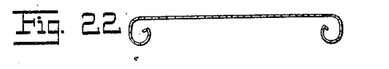
Figure 23:
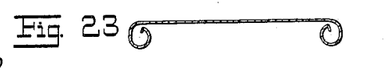
Figure 24:
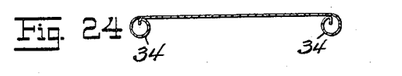
Figure 30:
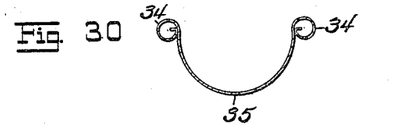

The machine is designed for producing eaves troughs of the form shown in Fig. 30. Each succeeding pair or set of coöperating rollers in the series of flanging rollers differs somewhat from the next preceding pair or set for gradually bringing the stock to the shape desired. Thus, when a plain sheet metal blank of the required width is introduced between the rollers 4 and 4$^a$ constituting the foremost set of said series, the extreme lateral edges thereof are bent downward at a right angle to form longitudinal terminal flanges 30, as shown in Fig. 9, said flanges being designed to constitute the inner lock of the bead when the latter has been completed. Passing thence between rollers 5 and 5ª, slight bends 31 are produced in the blank at points located inward an appropriate distance from said terminal flanges for forming marginal flange portions 32 having very slight downward inclinations, as shown in Fig. 10. The next four sets of said flanging rollers successively serve to increase the inclination of said marginal flanges 32 until, emerging from between the rollers 9 and 9ª, said flanges occupy the sharply inclined positions shown in Fig. 14. From the last-mentioned rollers the stock passes to and through a final set of flanging rollers designated generally by the numeral 33, whereby the flanges 32 are turned into positions at right angles to the body of the blank, as shown in Fig. 15. Said final set 33 of flanging rollers differs materially in form from the preceding rollers as and for a purpose which will hereinafter be explained.

Emerging from said final set 33 of flanging rollers the blank passes to the first set 14 of the series of beading rollers which are graduated so that they will successively operate upon the marginal flanges 32 of the blank and gradually form the lateral beads 34 shown in Figs. 24 to 30, inclusive, the various steps performed by the nine sets of rollers in said series being depicted in the nine figures of the drawings numbered Figs. 16 to 24, inclusive.

Figure 25:
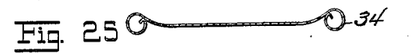
Figure 26:
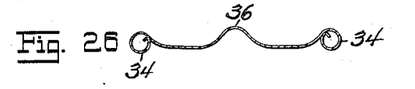
Figure 27:
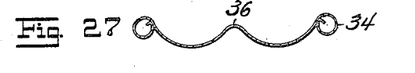
Figure 28:
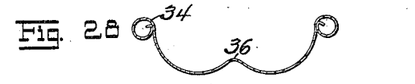
Figure 29:
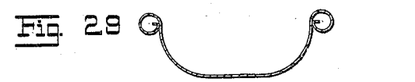

Emerging from the last set 22 of the beading rollers, the blank passes to the first set 23 of the third, or trough-forming, series of rollers which are also graduated so that the blank will be successively operated upon for gradually forming the regularly curved arcuate trough 35 shown in Fig. 30, the various steps performed by the six sets of rollers in said series being depicted in the six figures numbered Figs. 25 to 30, inclusive. In bringing the stock from the form shown in Fig. 24 to the finished shape shown in Fig. 30 the width of the blank is materially decreased—that is, in transforming the plain flat body of the blank into the final semicircular trough shape the distance between the beads 34 is greatly reduced. To effect this gradual reduction in width without undue distortion or rupture of the metal of the blank during the development of the trough shape, it being understood that the latter is being simultaneously operated upon in different portions of its length by a plurality of sets of rollers, requires the employment of a succession of rollers in which each succeeding set differs definitely, but not too radically, in form from the next preceding set. Moreover, in order that the curvature between said beads in the completed article shall be regular throughout, and, more specifically, in order that the metal adjacent to the beads shall be regularly curved, or prevented from standing at a substantially straight inclination tangential to the beads, it is desirable that the development of the trough be gradual and that the shaping of said metal adjacent to the beads shall precede the shaping of the intermediate portion. Thus, the rollers of the first set 23 of trough-forming rollers are shaped to slightly depress the body of the blank, producing a slight downward curvature closely adjacent to each bead, as shown in Fig. 25. The next set 24 presses the metal upward in a longitudinal direction to form a median rib 36, as shown in Fig. 26. The next set 25 is shaped to depress the metal at opposite sides of said rib, or between said rib and said beads into regular arcuate form, the arcs, or arc-shaped segments, produced being formed with relatively short radii, as shown in Fig. 27. The next succeeding set 26 is shaped to increase the size of said arcs—that is to produce arcs formed with slightly longer radii—further accentuating the curvature adjacent to each bead and drawing metal from said rib, as shown in Fig. 28. The next set 27 still further increases the sizes of said arcs, accentuates the curvature adjacent to each bead, and completes the withdrawal of stock from said rib, producing a trough having a flattened bottom, as shown in Fig. 29. And, finally, the set 28 of rollers completes the shaping of the body of the blank into true semi-circular trough form by depressing the lowermost portion thereof, as shown in Fig. 30.

As is apparent, the trough-forming operation described is accomplished without subjecting the metal to the action of forming members or tools which cause the metal to be abruptly flexed or to frictionally slide with respect to said members in the manner of preëxisting machines; and, consequently, the coating carried by the metal is not injured.

Each of the flanging rollers, except the set 33, as also each of the beading rollers, is composed of three sections, $a$, $b$ and $c$, of which the opposite end sections $a$ and $c$ are relatively adjustable on their shafts toward and away from the middle section $b$, thus adapting said rollers for adjustment to produce eaves troughs of different sizes. A separate series of trough-forming rollers is however required for each size of trough.

The set 33 of flanging rollers is composed of two oppositely disposed upper roller members $d$ adjustably mounted upon their carrying shaft, and a roller $e$ underlying and coöperating with each member $d$, said rollers

Figure 1:
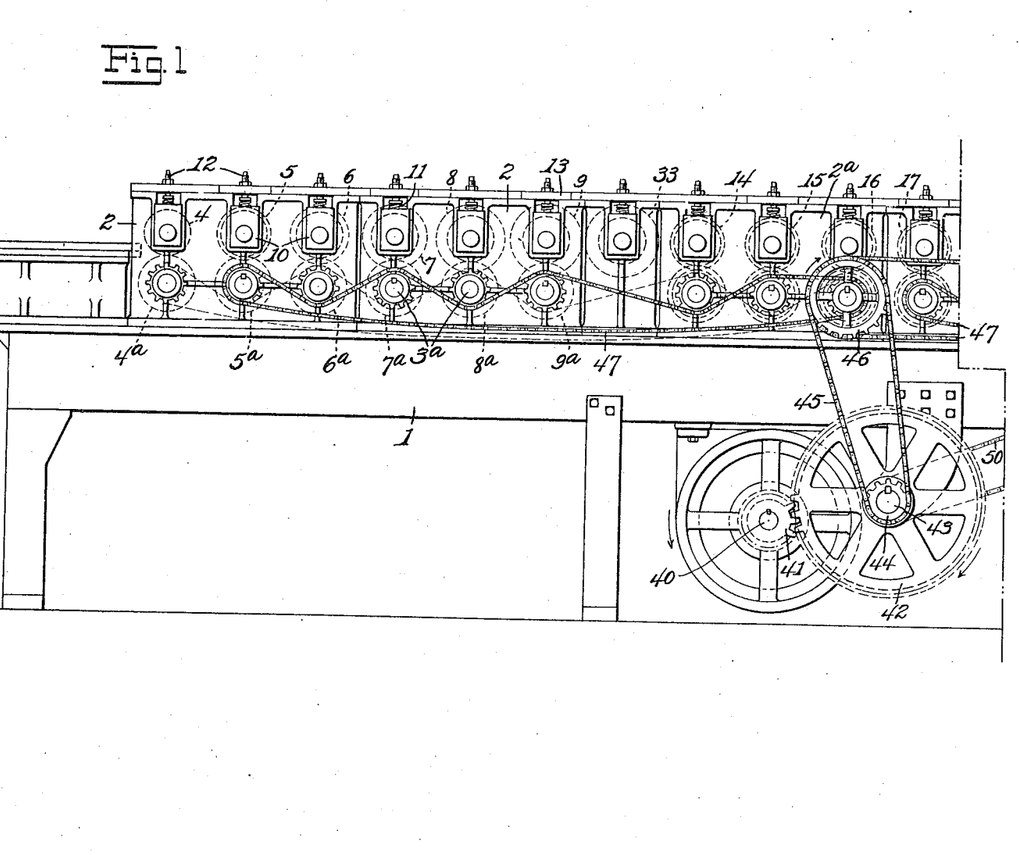
Figures 1, 1$^a$ and 1$^b$ together illustrate a side elevation of the invention.
Figure 1A:
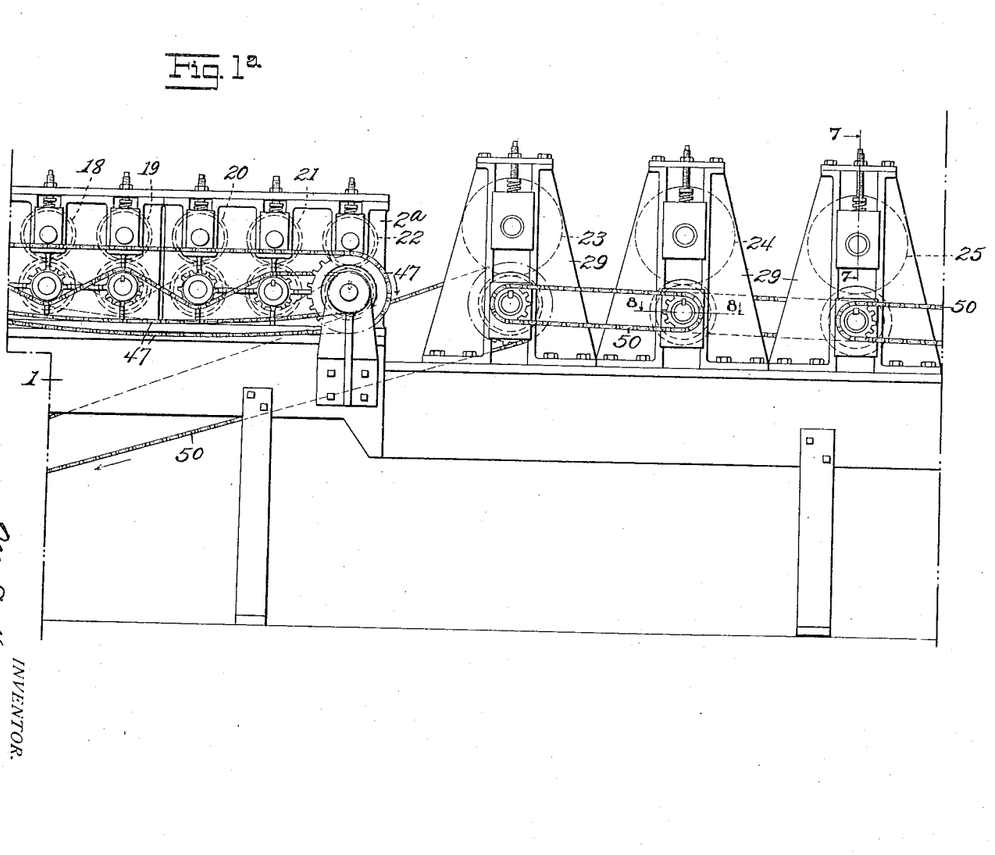
Figure 1B:
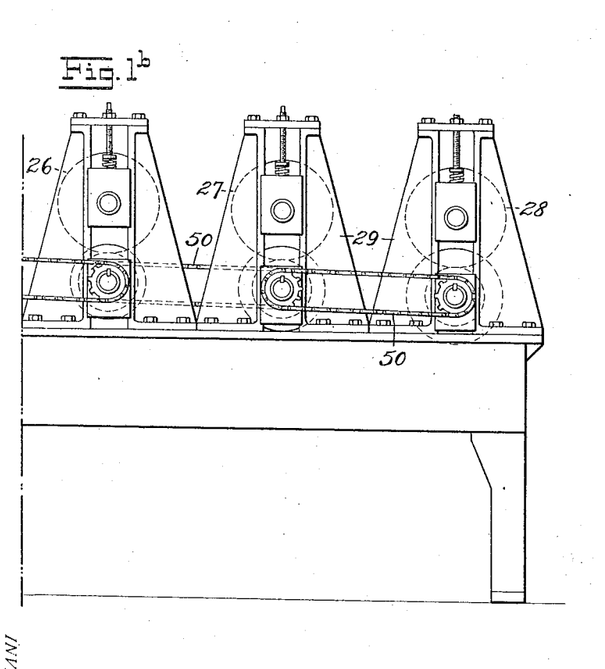
Figure 2:
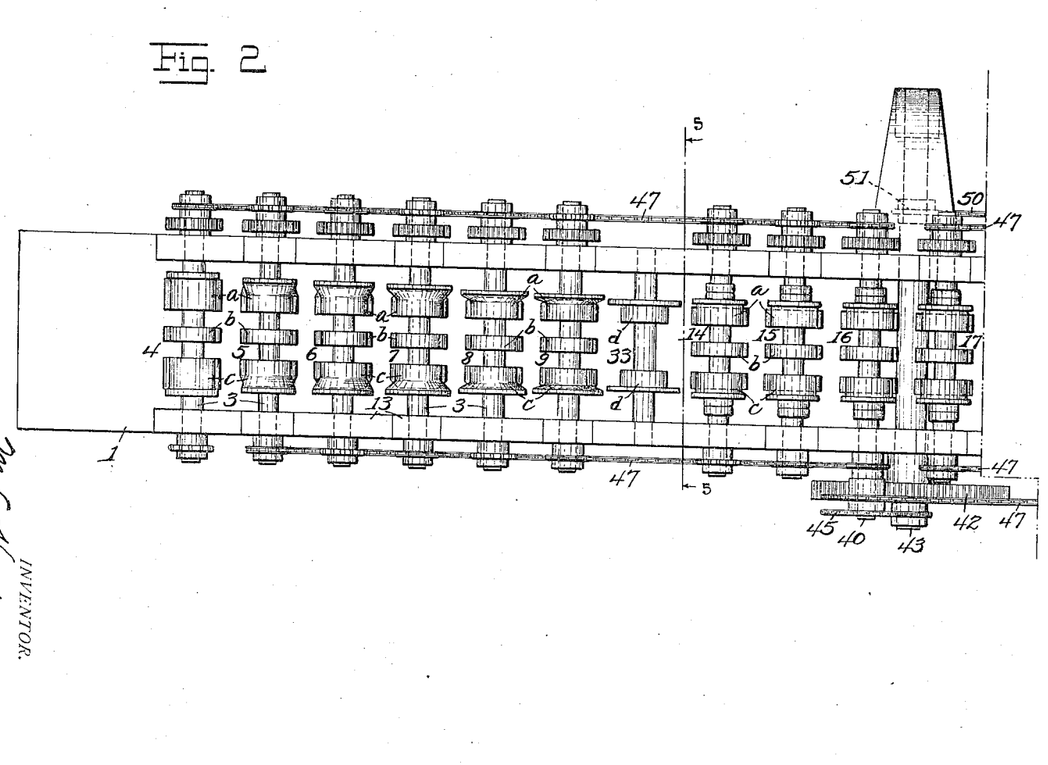
Figs. 2, 2$^a$ and 2$^b$ together illustrate a top plan view of the same.
Figure 2A:
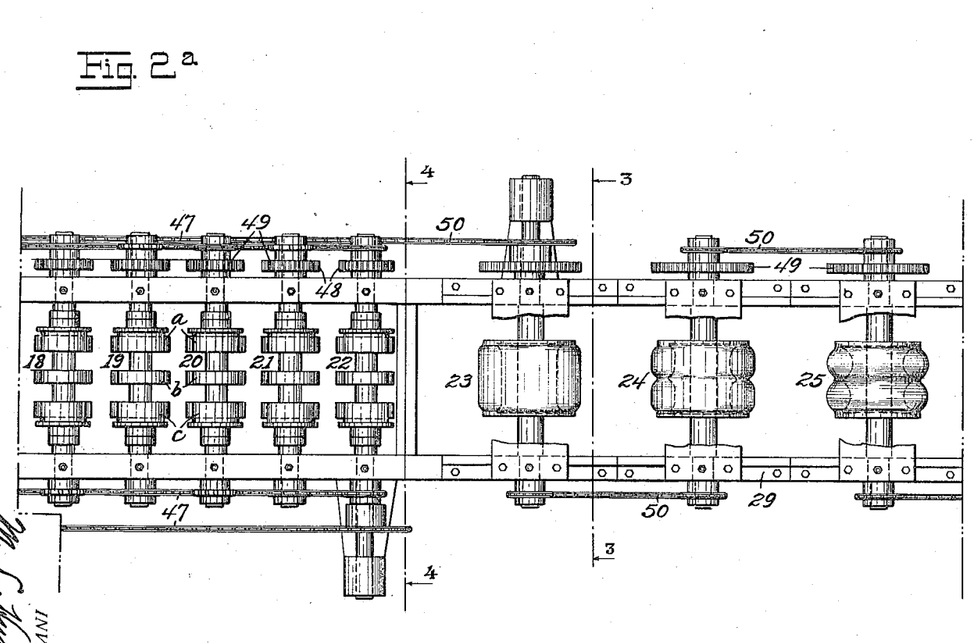
Figure 2B:
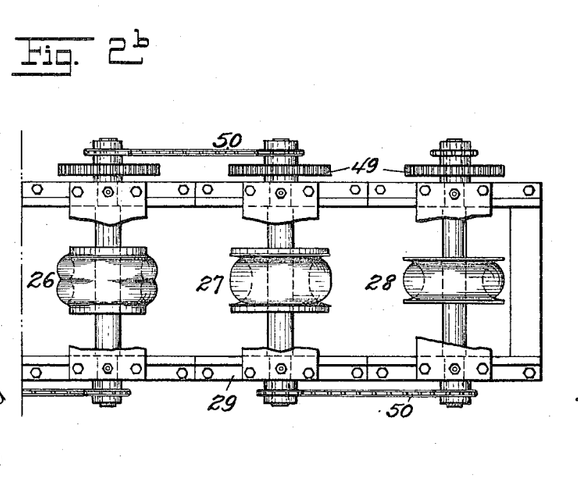
Figure 3:
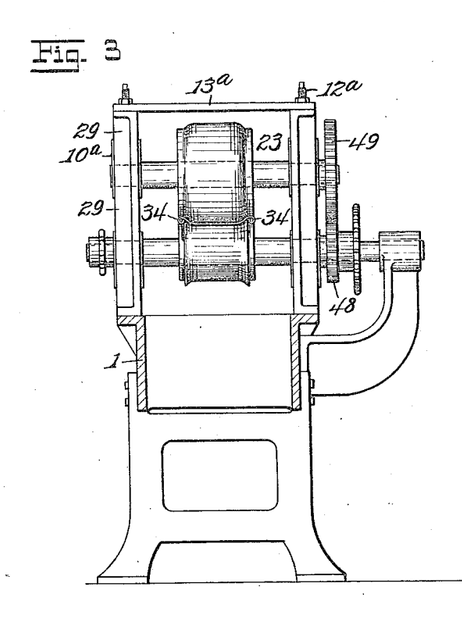
Figs. 3 and 4 are transverse sections taken respectively on lines 3—3 and 4—4 of Fig. 2$^a$.
Figure 4:
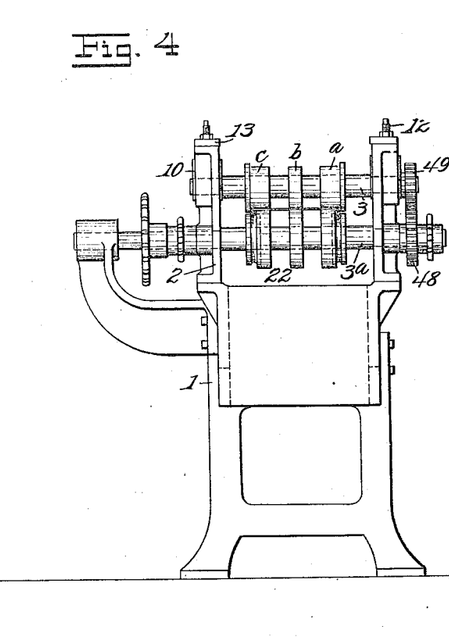
Figure 5:
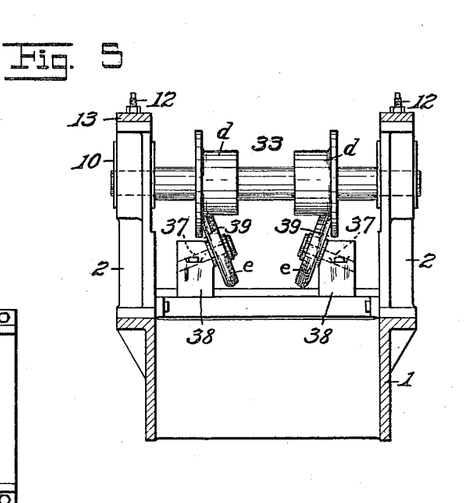
Fig. 5 is a similar section on line 5—5, Fig. 2.
Figure 6:
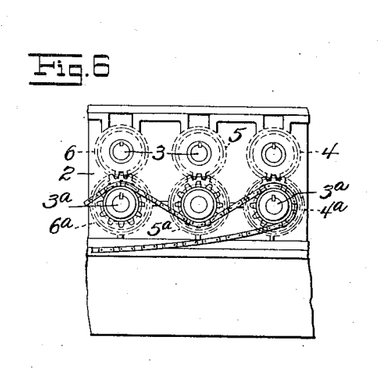
Fig. 6 is a fragmentary view in side elevation of a portion of the front end of the machine viewed from the side opposite the viewpoint in Fig. 1.
Figure 7:
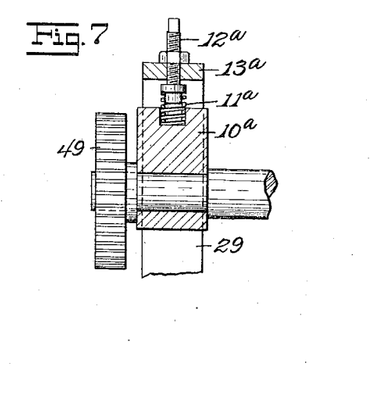
Fig. 7 is an enlarged detail section on the line 7—7, Fig. 1$^a$.
Figure 8:
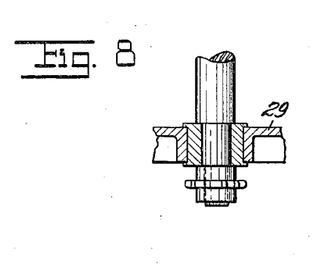
Fig. 8 is a similar section on line 8—8, Fig. 1$^a$.

*e* being journaled upon separate stub-shafts 37 disposed at a suitable angle and mounted in supporting blocks 38 which are relatively adjustable upon the table. This arrangement of the rollers *e* is required because of the presence of the terminal flanges 30 of the blank which would obviously engage rollers disposed in the usual upright position and thereby prevent the turning of the flanges 32 to positions at right angles to the body of the blank. With said rollers disposed at a suitable inclination, as shown in Fig. 5, a space 39 is afforded for the reception of each of said terminal flanges.

Each of the various roller-carrying shafts except those carrying the rollers *d* and *e* are preferably positively driven, as through suitable gearing including sprocket wheels and chains which are suitably arranged. The particular gearing herein depicted exemplifies one of various arrangements of gearing which might be employed, the same including a drive-shaft 40 for connecting with a source of power, a gear wheel 41 fixed on said drive-shaft and in mesh with a gear 42 fixed on a shaft 43 which carries a sprocket wheel 44 connected by a sprocket chain 45 to a sprocket wheel 46 upon an end of the lower of one of the shafts carrying the beading rollers. From the last-mentioned shaft power is communicated to the various lower shafts of the flanging and beading rollers through a series of suitably arranged sprocket chains generally designated by the numeral 47. The upper rollers are positively driven through gear wheels 48 and 49 respectively carried by the lower and upper shafts. The trough-forming rollers are driven by a series of chains 50 receiving power from a sprocket wheel on the shaft 43. As is obvious, to positively drive the inclined stub-shafts 37 of the set 33 of flanging rollers would necessitate the employment of a relatively complex form of gearing. Inasmuch as experience has shown that all gearing for said set of rollers may be dispensed with, said set is preferably driven only by frictional engagement with the blank which is acted upon.

What is claimed is—

1. An eaves trough forming machine comprising a plurality of series of rollers for successively operating upon a sheet-metal blank, each series except the last preparing the sheet for the action of, and advancing said sheet to, the next succeeding series, the rollers of the first series successively operating to form marginal flanges upon the blank, the rollers of the second series successively operating upon said flanges to form lateral beads while the body of the blank retains its original flat form, and the rollers of a third series successively operating upon said blank between said beads to form a trough, said third series including rollers whereby two parallel arc-shaped segments having relatively short radii and an intermediate rib are preliminarily formed in the body of the blank and including rollers whereby said rib and adjacent portions of the body are subsequently depressed for completing the drawing of said body into its final semi-circular form.

2. A machine comprising a plurality of series of rollers for successively operating upon a sheet-metal blank to produce an eaves trough, each series functioning to impart to the blank a shape prerequisite to the reception of said blank by the next succeeding series, the rolls of the first series operating to form marginal flanges on the blank, the rollers of the second series being mounted upon parallel axes and successively operating upon said flanges to form lateral beads, and the rollers of a third series successively operating upon said blank between the preformed beads to form a trough, said third series including rollers whereby said beads are firmly gripped, and whereby, while so gripped, a median rib and two arc-shaped segments separated by said rib are preliminarily formed in the body of the blank between said beads, said segments having relatively short radii so that the metal adjacent to said beads receives the final curvature, and said third series also including rollers whereby said rib is subsequently pressed out and a regular curvature is imparted to the middle portion of the blank.

3. In an eaves trough forming machine, the combination of a plurality of alined series of pairs of rollers whereby a sheet-metal blank is subjected to a series of operations in a requisite sequence, the rollers of the first of said series being adapted to operate upon a sheet-metal blank by a series of successive bending steps to progressively form marginal flanges disposed at right angles to the body of the blank while said body retains its flat form and to advance said blank to the second series, the rollers of said second series being mounted on parallel axes and being adapted to operate upon said flanges by a series of successive steps to progressively form lateral beads, and the rollers of the third series being adapted to operate upon the flat body of said blank between the formed beads by a series of successive steps to progressively bend the same into trough shape, said third series including rollers having portions whereby said beads are firmly gripped and having intermediate portions whereby a median rib and two arc-shaped segments separated by said rib are formed in said body, said segments having relatively short radii so that the metal adjacent to said beads receives its final curvature, and also including rollers whereby, as a final operation, said rib is progressively pressed out by a succession of bending steps for completing the drawing of said body into semi-circular form.

4. An eaves trough forming machine comprising means for turning upon a sheet-metal blank marginal flanges disposed at right angles with respect to its body, means for shaping said flanges to form thereof lateral beads while said body retains its original form, and a series of sets of rollers for successively operating upon said blank to form in said body a median rib and two arc-shaped segments separated by said rib, and finally to depress said rib to complete the bending of said body into semi-circular form, said rollers acting to grip the preformed beads to prevent sliding movement of the blank during the performance of their body-shaping functions.

In testimony whereof, I affix my signature in presence of two subscribing witnesses.

MARTIN L. HUNKER.

Witnesses:
H. E. DUNLAP,
W. F. KEEFER.

Copies of this patent may be obtained for five cents each, by addressing the "Commissioner of Patents, Washington, D. C."